United States Patent [19]

ten Berge et al.

[11] Patent Number: 4,785,701
[45] Date of Patent: Nov. 22, 1988

[54] NOTCHING APPARATUS FOR OPTICAL FIBER IN WHICH THE FIBER FUNCTIONS AS A SPRING

[75] Inventors: Edvardus F. A. ten Berge, Drunen; Marinus H. J. Krevveld, G.C. Sint Oedenrode, both of Netherlands

[73] Assignee: AMP Incorporated, Harrisburg, Pa.

[21] Appl. No.: 765,562

[22] Filed: Aug. 13, 1985

Related U.S. Application Data

[63] Continuation of Ser. No. 590,233, Mar. 16, 1984, abandoned.

[51] Int. Cl.⁴ .................................................. B26D 3/08
[52] U.S. Cl. .......................................... 83/879; 225/2; 225/96
[58] Field of Search ...................... 225/2, 94, 96, 96.5; 83/879, 880; 65/2, 10.2, 87, 174

[56] References Cited

U.S. PATENT DOCUMENTS

| | | | |
|---|---|---|---|
| 3,934,773 | 1/1976 | Chinnock et al. | 225/2 |
| 4,203,539 | 5/1980 | Miller | 225/2 |
| 4,245,537 | 1/1981 | Curtis | 83/879 |
| 4,450,995 | 5/1984 | Leiby et al. | 225/96.5 X |
| 4,463,886 | 8/1984 | Thornton | 225/96.5 |

*Primary Examiner*—Fred A. Silverberg
*Attorney, Agent, or Firm*—Robert W. J. Usher; Fritz Raring

[57] ABSTRACT

Optical fiber is scribed to produce a notch by the use of a fiber holder, a circular scribing edge which is spaced from the fiber holder by a first distance, a fiber deflector which is spaced from the fiber holder by a second distance and which is movable laterally to deflect the fiber by a third distance. When the fiber is deflected by the fiber holder, the fiber is brought into contact with the circular scribing edge and is moved along the edge for a short distance. The first, second, and third distances are selected to produce a scribing force which is within a predetermined range.

3 Claims, 5 Drawing Sheets

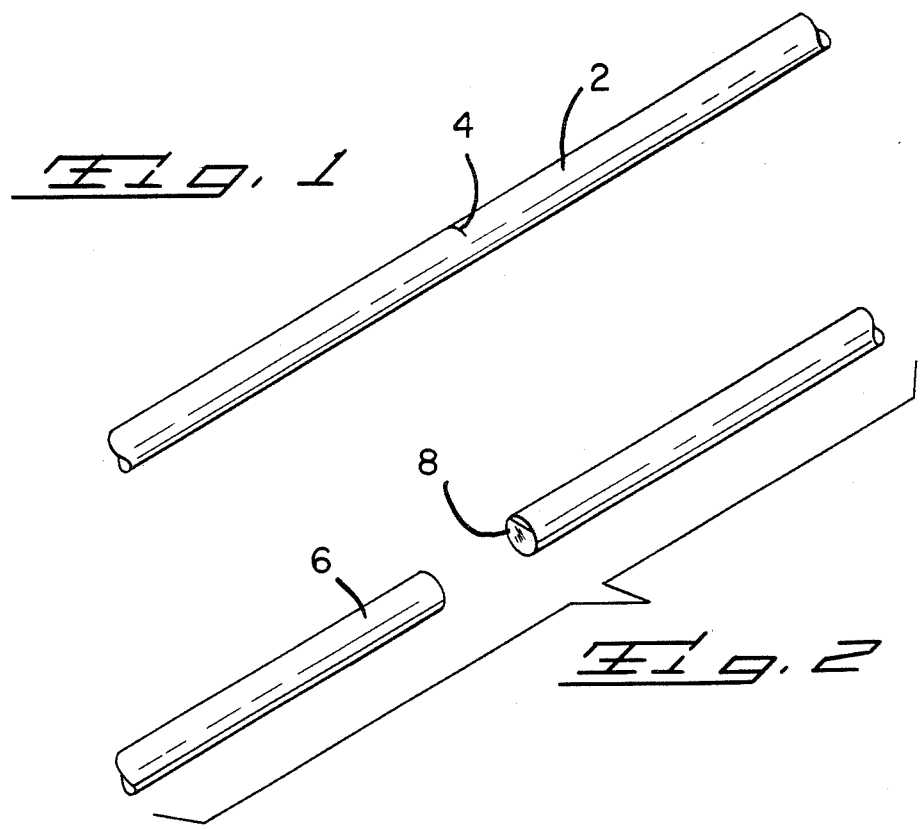
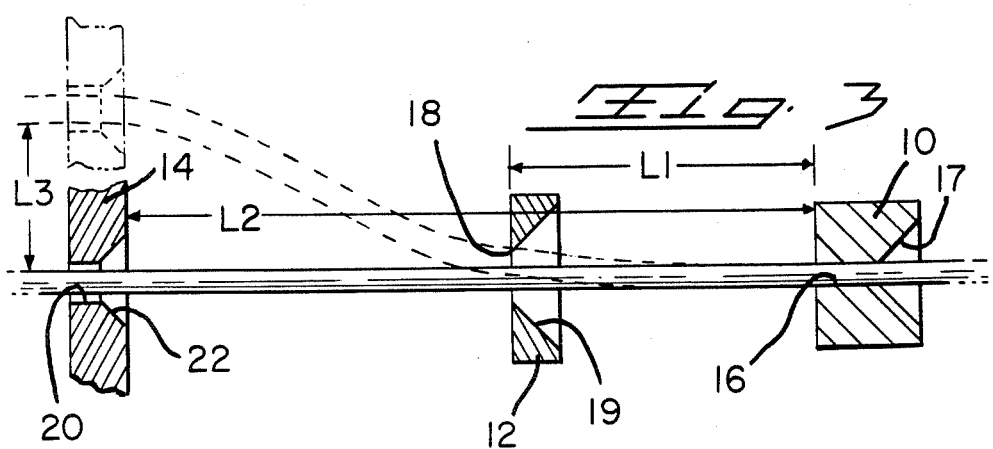

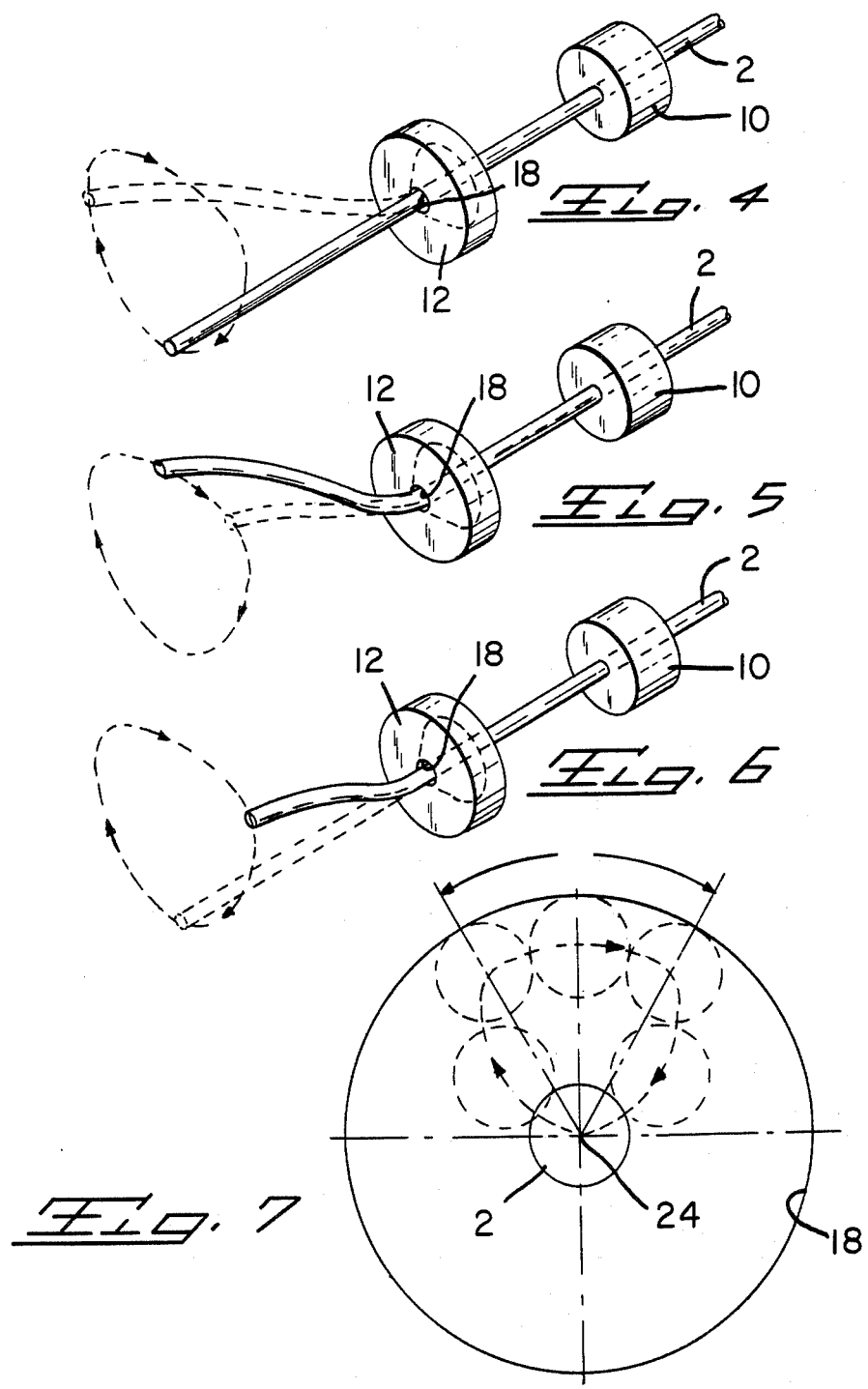

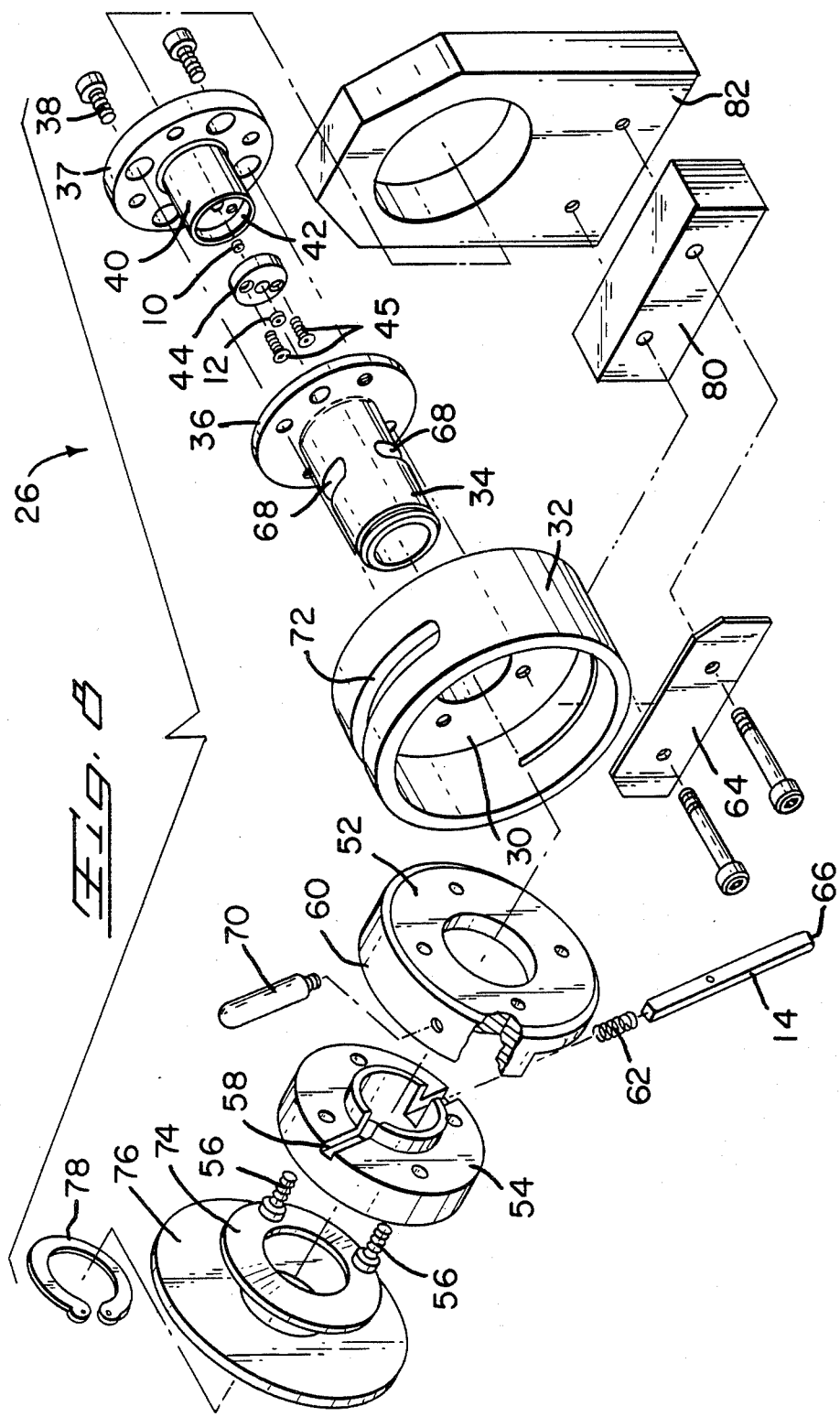

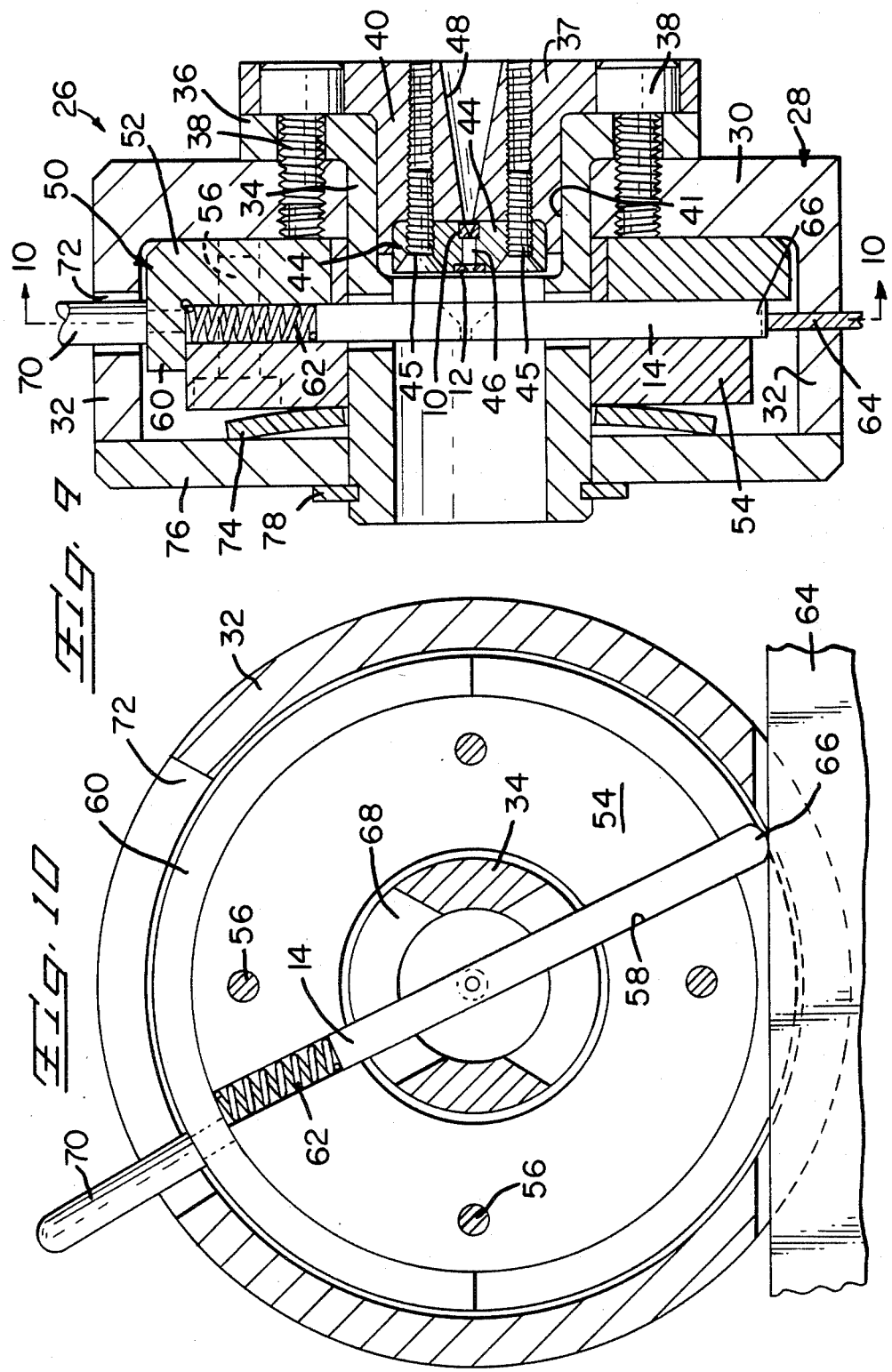

NOTCHING APPARATUS FOR OPTICAL FIBER IN WHICH THE FIBER FUNCTIONS AS A SPRING

This application is a continuation of application Ser. No. 590,233 filed Mar. 16, 1984, now abandoned.

FIELD OF THE INVENTION

This invention relates to methods and apparatus for scribing optical fibers under controlled conditions to produce a notch in preparation for breaking the fiber.

BACKGROUND OF THE INVENTION

When optical fibers are spliced to each other, it is desirable that the ends of the fibers have a smooth surface which extends substantially normally of the fiber axis. It is now recognized that if the fiber is carefully notched and then broken under controlled conditions, an excellent surface can be obtained which is as good as the surfaces which were previously obtained by careful polishing of the end of the fiber. A notch is provided at the location of the break in order to concentrate the stresses when the fiber is broken and to cause a crack to propagate across the fiber under controlled conditions which will produce the desirable smooth surface on the end of the fiber after breaking, see "Optical Fiber End Preparation; a New Method for Producing Perpendicular Fractures in Glass Fibers, Coated Glass Fibers, and Plastic-Clad Fibers", G. D. Khoe et al, *Applied Optics*, Volume 20 No. 4, Pages 707–714 and see also U.S. Pat. No. 3,934,773. While the recommended scribing and breaking procedures of these two publications differ in some respects, both state that the scribing operation must be carefully controlled and the scribing edge should be urged against the surface of the fiber with only a relatively low force. In general, the known scribing devices for notching optical fibers are designed such that the scribing edge is urged against the fiber with a force that is produced by mechanical means, for example, U.S. Pat. No. 3,934,773 shows a scribing apparatus in the form of a lever which is pivoted intermediate its ends and which is adapted to be counterbalanced to produce the required force. It can be appreciated that where purely mechanical devices are relied upon to impose the load on the scribing edge that will produce the desired force, a high degree of precision is required in the apparatus and a measure of skill must be exercised by the technician who is forming the notch in the fiber. The present invention is directed to an improved scribing method and apparatus which is relatively simple in its construction, which can be operated without the exercise of a high degreee of laboratory skill, and which will reproducibly scribe optical fibers in a manner such that upon subsequent breaking of the fibers, smooth surfaces will be obtained which will extend substantially normally of the fiber axis.

THE INVENTION

The apparatus embodiment of the invention comprises a notching or scribing apparatus of the general type comprising a fiber holder for holding the fiber at a support location and a notching edge which is located on one side of the fiber axis (the axis of a fiber held in the fiber holder) and which is urged against the fiber at the notch location with a force which is within a predetermined range. The apparatus is particularly characterized in that the notching edge is spaced from the fiber holder along the fiber axis by a first distance and a fiber deflector is located beside the fiber axis and spaced from the fiber holder by a second distance. The fiber deflector and a fiber held in a fiber holder and extending through the deflector are movable relatively towards each other and laterally of the fiber axis to deflect the fiber by a third distance in the vicinity of the fiber deflector. Deflection of the fiber causes the fiber to be moved against the notching edge and scribed to produce the notch required. The first, second, and third distances are selected to deflect the fiber at the notch location and urge the notching edge against the fiber with a force which is within the desired predetermined range. The fiber itself thus acts as a spring member and determines the force with which the notching edge is urged against the fiber.

In accordance with further embodiments, the second distance is greater than the first distance and the notching edge is in the form of a circular edge which surrounds the fiber axis.

In accordance with a further embodiment, the fiber deflector comprises a deflector block having an opening extending therethrough which receives the fiber. A deflector actuator is provided which moves the deflector block laterally of the fiber axis along a closed circuit path which includes a segment that extends parallel to the fiber axis so that the fiber is moved relatively over the notching edge.

The method aspect of the invention is carried out by positioning the fiber in a fiber holder, locating a notching edge at a first distance from the fiber holder along the fiber axis, and applying a fiber deflecting force to the fiber at a deflecting location which is spaced from the fiber holder by a second distance. The fiber is deflected by the fiber deflector a third distance so thtat at the notch location, the fiber is brought into engagement with the notching edge. The first, second, and third distances are selected to produce a notching force which is within the predetermined range and which is produced as a result of the flexure of the fiber.

THE DRAWING FIGURES

FIG. 1 is a perspective view of an optical fiber having a notch therein in preparation for breaking.

FIG. 2 is a view which shows the fiber after it has been broken at the notch.

FIG. 3 is a sectional side view showing the essential elements of an apparatus in accordance with the invention, this being a diagramatic view for the purpose of illustrating the principles of the invention.

FIGS. 4–6 are perspective diagramatic views illustrating the sequence of steps followed in carrying out the invention.

FIG. 7 is a diagramatic view illustrating the path of movement of a fiber when it is moved towards and over the scribing edge of the apparatus.

FIG. 8 is a perspective view of an apparatus in accordance with the invention.

FIG. 9 is a sectional side view of the apparatus.

FIG. 10 is a view taken along the lines 10—10 of FIG. 9.

THE DISCLOSED EMBODIMENT

Figure 11:
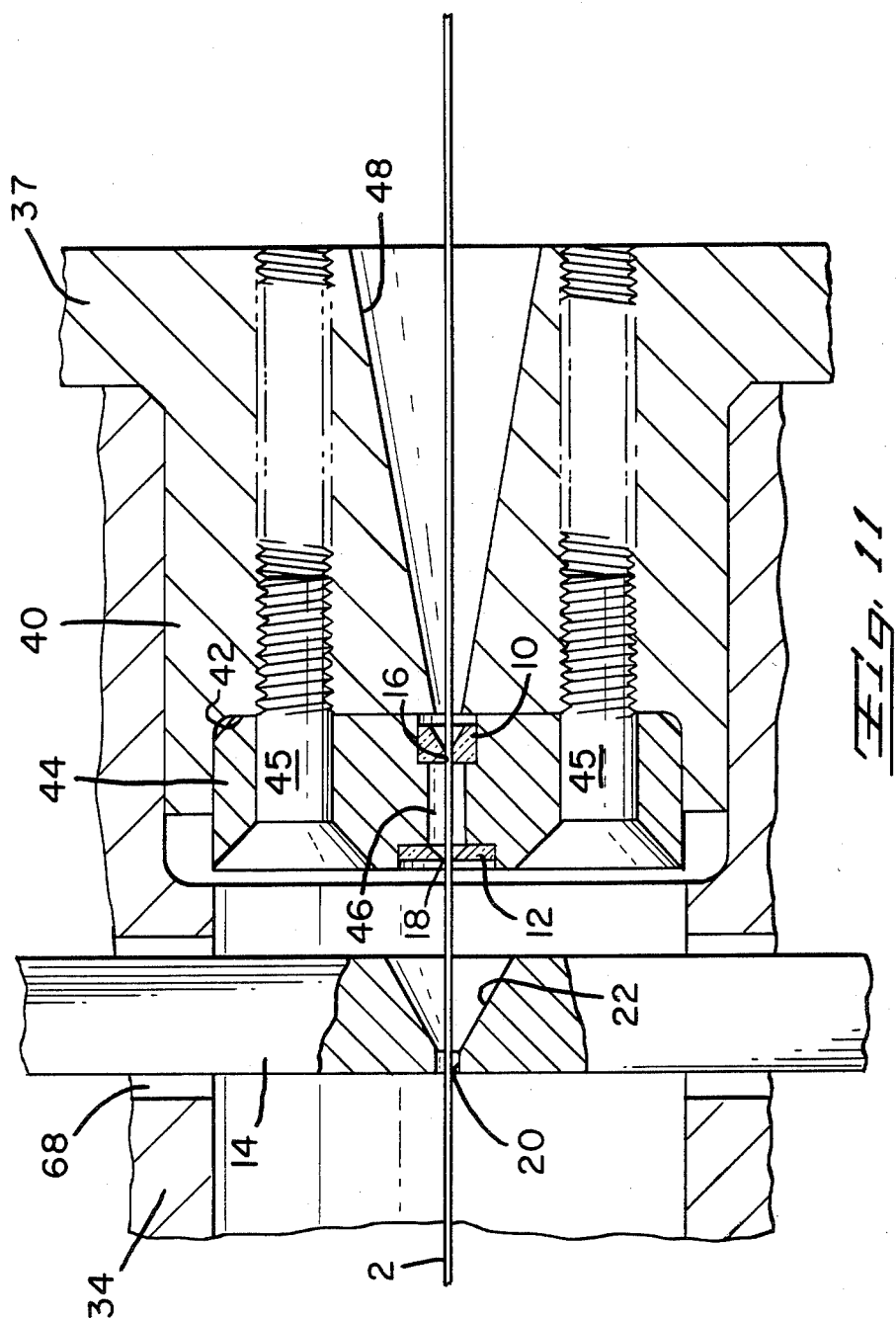
FIG. 11 is an enlarged sectional side view of the apparatus.

FIG. 1 shows an optical fiber 2 having a notch 4 at a location at which it is desired to break the fiber. If the fiber is carefully notched and broken under controlled conditions, the surface 8 of the fiber after the end portion 6 has been broken off will be extremely smooth and will extend substantially normally of the fiber axis so that a fiber optic connecting device or splicing device can be installed on the end of the fiber without further preparation of the end surface 8.

The notch 4 is preferably formed by moving a scribing edge against the surface of the fiber and moving the fiber relative to the edge while the edge is urged agains the fiber with a force that is within a predetermined range. In general, a force within the range of about 5-10 gm is preferred and if the force is unduly high, a roughened surface 8 will be produced at the fracture. It is also desirable that the fiber or the edge be moving when the force is applied, in other words, the edge should be moved towards the fiber and be maintained in motion while the notch is being scribed in the surface of the fiber. FIGS. 3-6 show the essential elements of an apparatus in accordance with the invention which is capable of forming the notch 4 under the ideal conditions discussed above. The invention will first be described with reference to FIGS. 3-6 and this description will be followed by a description of a specific apparatus for carrying out the invention.

The practice of the invention requires a fiber holder or fiber clamp 10, a scribing ring 12, and a fiber deflector 14. The fiber holder 10 has an opening extending therethrough as shown at 16 which has a diameter only slightly greater than the diameter of the optical fiber 2; for example, if the optical fiber has a diameter of 125 microns, the opening 16 may have a diameter of 130 microns. The fiber will then be so closely confined after it has been inserted through the opening that it is in effect clamped. A conical entrance 17 is provided in the holder 10 which leads to opening 16 to guide the fiber through the opening.

The scribing ring 12 has a conical surface 19 which leads to a circular scribing edge 18. The scribing ring is preferably of sapphire or similar material although it can be produced of a carbide or a high quality tool steel.

The fiber deflector 14 comprises a block which is relatively elongated having an opening 20 extending therethrough which extends from a conical surface 22. The opening 20 receives the fiber but should be relatively larger than the opening 16 in the fiber holder, for example, if the fiber has a diameter of 125 microns, good results will be achieved if the opening 20 has a diameter of about 600 microns.

As indicated in FIG. 3, the circular scribing surface 18 is spaced from the fiber holder 10 by a first distance indicated as $L_1$ and the fiber deflector is separated from the fiber holder by a second distance $L_2$ which is greater than $L_1$. The fiber deflector moves laterally of the fiber axis (the axis of a fiber extending from the fiber holder as shown in FIG. 3) and deflects the fiber a distance $L_3$ in the vicinity of the fiber deflector. These distances are important to the practice of the invention for reasons which will be discussed below.

Referring now to FIGS. 4-6, the notch 4 is produced in the fiber by threading the fiber through the fiber holder 10, through the central opening in the scribing ring 12, and through the opening 20 in the fiber deflector. The deflector is then moved laterally of the fiber axis and perpendicular to the fiber axis as shown in FIG. 7 and the fiber is as a result flexed in the manner of a cantilever beam. The deflection is greatest in the vicinity of the fiber deflector 14 however, the beam is deflected along most of its length and in the vicinity of the scribing ring 12, the beam is deflected by an amount sufficient to bring the desired notch location against the circular edge 18 of the scribing ring 12. The fiber is moved along this edge through a predetermined scribing angle indicated in FIG. 7 and then is returned to its starting position so that its axis corresponds with the fiber axis or reference axis 24.

FIGS. 8-10 show a specific form of apparatus 26 for carrying out the invention which incorporates the three essential element disclosed and described in FIGS. 3-6. The apparatus comprises a frame 28 which is composed of a vertically extending circular plate 30 having a flange 32 extending from its edge. A hollow sleeve or bushing 34 is mounted in a central opening in the frame and has an outwardly extending flange 36 which is secured to the right-hand surface (as viewed in FIG. 9) of the plate 30 by suitable fasteners 38. A cylindrical adapter 40 is received in a counterbore 40 in the bushing 34 and has a flange 37 through which fasteners 38 extend.

The adaptor 40 has a recess 42 in which there is contained a support block 44 that is secured to the adapter 40 by fasteners 45. The block 44 has an axially extending bore 46 which is counterbored on the right-hand side to receive the holder 10 and which is counterbored on its left-hand side to receive the scribing ring 12. Adapter 48 has a recess extending therein that is conically tapered as shown at 40 so that the optical fiber can be pushed into this recess and will be guided into the opening 16 in the fiber holder and through the central opening in the scribing ring 12.

The fiber deflector 14 is contained in a guide ring assembly 50 which is composed of two rings 52, 54 which are secured to each other by fasteners 56. A slot 58 is provided in the surface of the ring 54 which is opposed to the ring 52 and the deflector 14 is slidably received in this slot. The ring 52 has a flange 60 which extends over the upper end of the slot as viewed in FIG. 9 and a spring 62 is positioned between the upper end of the deflector and the surface of this flange so that the deflector is biased downwardly as viewed in FIG. 9. The lower end 66 of the deflector 14 bears against the surface of a camming bar 64 which causes the deflector to move relative to the assembly 50 when the assembly is rotated as described below. The assembly has a handle 70 that extends through a slot 72 in the flange 32. Additionally, slots 68 are provided in the bushing 34 to permit relative movement of the central portion of the deflector that extends through the bushing 34.

A cover plate 76 is mounted against the flange 32 and retained in position by a lock washer 78. A spring washer 74 is positioned in surrounding relationship to the bushing 34 and between the opposed surfaces of the ring 54 and the surface of the cover plate.

The apparatus as described above may be suitably mounted on a support 80, 82 as shown or may be provided with a handle if desired so that it can be used as a hand tool.

In use, the handle 70 is moved to one of the extreme positions, to the limit of its travel in either direction, and the optical fiber is inserted into the adapter 40, through the aligned fiber holder and scribe member and through the opening in the deflector to the position shown in FIG. 9. Thereafter, the handle 70 is moved to its other extreme position and the fiber will be mvoed along the path shown in FIG. 7 to form the notch.

In the practice of the invention, the fiber is moved against the scribing edge 18 and the scribing force between the edge and the surface of the fiber is established at the instant that the fiber comes into contact with the edge. This is regarded as an advantageous technique for scribing a notch as compared to the technique of placing the edge against the surface of the fiber under no load conditions and then imposing the load on the scribing edge. The latter technique is believed by some to cause chipping of the fiber while the notch is being formed and chipping in turn leads to an imperfect fractured surface which is less suitable for an optical splice.

The scribing angle, the arcuate or circumferential extent of the notch, formed by the disclosed form of apparatus is about 60 degrees however, the method of the invention can be used to form a notch which extends entirely around the circumference of the fiber. It has been found however that a notch of limited arcuate extent will produce excellent results if the fiber is later broken in a properly controlled manner, for example, by means of the method and apparatus disclosed in U.S. application Ser. No. 551,525 filed Nov. 14, 1983, now U.S. Pat. No. 4,662,710.

A salient feature of the inventoin is that the scribing force is established by the flexure of the fiber. Since the fiber has a small diameter and is quite flimsy, the first, second, and third distances can be selected to produce a scribing force which is within the 5-10 gm range.

We claim:

1. Apparatus for notching an optical fiber at a notch location in preparation for breaking the fiber, the apparatus comprising a fiber holder for holding the fiber at a fiber support location and a notching edge which is located on one side of the fiber axis of a fiber held in the fiber holder and which is urged against the fiber at the notch location with a force which is within a predetermined range, the apparatus being characterized in that:

the notching edge is spaced from the fiber holder along the fiber axis by a first distance, a fiber deflector is located beside the fiber axis and is spaced from the fiber holder by a second distance, the fiber deflector being effective to move a fiber held in the fiber holder laterally of the fiber axis to deflect the fiber by a third distance at the second distance from the fiber holder, the deflection being relatively towards the notching edge, the fiber functioning as a spring when it is deflected, the first, second and third distances being selected to deflect the fiber at the notch location and urge the notching edge against the fiber at the notch location with a force which is within the predetermined range, the second distance being greater than the first distance and the notching edge being circular and surrounding the fiber axis, the fiber deflector comprising a deflector block having an opening extending therethrough which receives the fiber, and a deflector actuator which moves the deflector block laterally of the fiber axis along a closed circuit path which includes a segement that extends over the notching edge, the deflector actuator comprising a rotatable guide which is coaxially mounted with respect to the fiber axis, the deflector block being slidably mounted in the guide, and a cam which causes the movement of the deflector block in the guide when the guide is rotated.

2. Apparatus as set forth in claim 1 characterized in that the rotatable guide has a diametric slot therein, the deflector block being slidably mounted in the slot.

3. Apparatus as set forth in claim 2 characterized in that the deflector block has an end which bears against the cam so that upon rotation of the rotatable guide, the end of the deflector block moves over the cam whereby the deflector block is moved.

* * * * *